United States Patent [19]
Hatakeyama

[11] Patent Number: 5,369,774
[45] Date of Patent: Nov. 29, 1994

[54] METHOD AND APPARATUS FOR HANDLING ARRAY TYPE DATA IN A DATA DRIVEN TYPE INFORMATION PROCESSOR

[75] Inventor: Kouichi Hatakeyama, Nara, Japan

[73] Assignee: Sharp Kabushiki Kaisha, Osaka, Japan

[21] Appl. No.: 12,476

[22] Filed: Feb. 2, 1993

[30] Foreign Application Priority Data

Feb. 4, 1992 [JP] Japan .................................. 4-18780

[51] Int. Cl.$^5$ ................................................ G06F 9/00
[52] U.S. Cl. .................................. 395/800; 364/264; 364/DIG. 1
[58] Field of Search ................ 395/800, 375, 775, 650

[56] References Cited

U.S. PATENT DOCUMENTS

| | | | |
|---|---|---|---|
| 5,021,947 | 6/1991 | Campbell et al. | 395/700 |
| 5,029,080 | 7/1991 | Otsuki | 395/375 |
| 5,241,683 | 8/1993 | Okamoto | 395/800 |

*Primary Examiner*—Alyssa H. Bowler
*Assistant Examiner*—John Harrity

[57] ABSTRACT

Prior to an execution of a data flow program by a data driven type information processor, array type data is selectively designated as data to be stored in an extended data storing unit or as data to be supplied to an information processor in the form of a data packet during execution of the program based on whether a value of the array type data to be processed in accordance with the program is already defined. As a result, as compared with a conventional system on which array type data are uniformly stored in the extended data storage unit to execute the data flow program, the method of the present invention reduces the number of accesses to the extended data storage unit. The reduction is equivalent to the amount of the array type data supplied as data packets, thereby increasing a data flow program execution processing speed and enhancing an effective use of a memory of the extended data storage unit.

20 Claims, 15 Drawing Sheets

—FLOW ARRAY—
FIG.1A PROGRAM
```
fstruct flow
{int     ar[3]}f;
    ar[3]++;
```
FIG.1B FLOW GRAPH
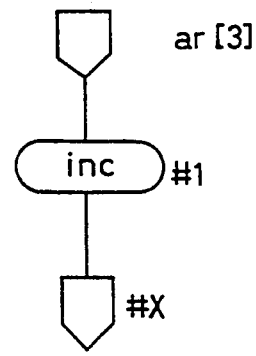
—MEMORY ARRAY—
FIG.2A PROGRAM
```
int    ar[3];
   ar[3]++;
```
PRIOR ART
FIG.2B FLOW GRAPH
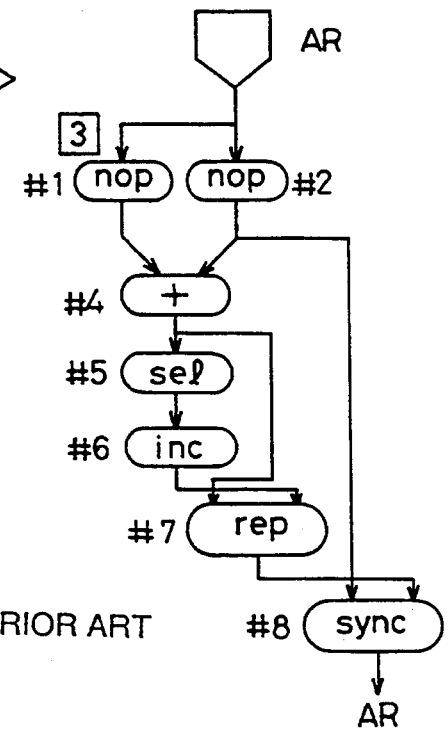
PRIOR ART

FIG.4

| #1 | #X | inc | ABSENSE |

FIG.5 PRIOR ART

| #5 | #6 | sel | ABSENSE |
| #1 | #4 | nop | PRESENSE |
| | 3 | | ABSENSE |
| #2 | #4 | nop | PRESENSE |
| | #8 | sync | ABSENSE |
| #4 | #5 | + | PRESENSE |
| | #7 | + | ABSENSE |
| #8 | #X | sync | ABSENSE |
| #7 | #8 | rep | ABSENSE |
| #6 | #7 | inc | ABSENSE |

FIG.9     PRIOR ART

—PROGRAM USING MEMORY ARRAY— int    A[3], B[3];

para   ( i = 0 ; i<3 ; i++ ) {

SP = A[i] * B[i];

} sum (SP);

—FLOW GRAPH USING MEMORY ARRAY—

—PROGRAM USING FLOW ARRAY—

```
fstruct   flow   {int A[3];
int B[3];
}f;

para  (i=0 ; i<3 ; i++) {
sp=f.A[i] * f.B[i];
}sum(SP);
```

—FLOW GRAPH USING FLOW ARRAY—

INDEFINITE I

SELECTION EXAMPLE OF DATA FLOW DIRECTION WHEN I IS DEFINITE

WHEN I IS DEFINITE AS 3

MAIN PROGRAM: main.fc

```
main(a,b)
int   a,b;
{
    int   X;
    X=a+func1(a,b);
    return(X);
}
```

SUB-PROGRAM: func1.fc

```
func1(a,b)
int   a,b;
{
    int   r;
    r=(a+b)*(a-b);
    return(r);
}
```

FLOW GRAPH OF MAIN ( )

FLOW GRAPH OF func1 ( )

METHOD AND APPARATUS FOR HANDLING ARRAY TYPE DATA IN A DATA DRIVEN TYPE INFORMATION PROCESSOR

BACKGROUND OF THE INVENTION

1. Field of the Invention

The present invention relates generally to a method of controlling an execution of a data flow program in information processor and an apparatus therefor, and more particularly, to a method of controlling execution of a data flow program for processing array type data and an apparatus therefor.

2. Description of the Background Art

In a conventional von Neuman computer, various instructions are stored as a program in a program memory in advance, and addresses in the program memory are sequentially specified by a program counter so that the instructions are sequentially read out, whereby instructions are executed.

On the other hand, a data driven type information processor is one type of non-vonNeuman computers which do not use the concept of sequential execution of instructions by a program counter. Such data driven type information processor an architecture based on parallel processing of instructions. In the data driven type information processor execution of an instruction is enabled upon collection of data to be operated, and a plurality of instructions are simultaneously driven by data, so that programs are executed in parallel in accordance with a natural flow of the data. As a result, the time required for the operation will be drastically reduced.

FIG. 13 is a schematic diagram showing the structure of a data driven type information processor to be applied to a conventional example and one embodiment of the present invention. FIG. 14 shows a field structure of a data packet circulating through the data driven type information processor to be applied to a conventional example and an embodiment of the present invention.

In FIG. 14, a data packet PA includes a destination field F1 for storing destination information including branch information, an instruction field F2 for storing instruction information, a data 1 field F3 and a data 2 field F4 for storing operand data.

With reference to FIG. 13, a data driven type information processor 1 is connected to a data packet generation/supply unit 8. Externally provided to the main body of a processing unit of information processor 1 are an extended data storage unit 2 and an extended program storage unit 7 having a large capacity and a low access rate. The main body of tile processing unit of information processor 1 further includes an input/output control unit 3, a program storage unit 4 having a small capacity and a high access rate for storing a data flow program to be executed, a firing control unit 5 which has a queuing memory 51 and serves for detecting paired data, and an operation unit 6.

Data packet generation/supply unit 8 includes a load packet processing portion 81 for loading a program to be executed or data to be processed in accordance with the program in the information processor prior to execution of the program at information processor 1, and a packet for execution processing portion 82 for supplying data to be processed during program execution to information processor 1. Load packet processing portion 81 loads the program or the data in the form of data packets 20P and 21P to information processor 1, while packet for execution processing portion 82 supplies data to be processed in the form of a data packet 22P to information processor 1. Details of such data packets will be described later.

Extended program storage unit 7 functions as an extended storage device related to a data flow program to be executed by information processor 1. Storage unit 7 receives a data packet PA to carry out initial writing of program data by using the received packet PA at the program loading, and reads the program data by addressing based on destination information in a data packet PA applied from firing control unit 5, stores the read data into a data packet and outputs the data packet to program storage unit 4 when the program is executed.

FIG. 15 shows a structure of the extended data storage unit 2 in block. Extended data storage unit 2 functions as an extended storage device related to data to be processed in accordance with the data flow program at information processor 1. FIG. 16A and 16B show field structures of a data packet for use in accessing extended data storage unit 2. A data packet 10P of FIG. 16A stores an access instruction ACC for accessing the extended data storage unit 2 in a field F2, stores address information AD related to an instruction ACC in a field F3 and stores write data WD to be written in extended data storage unit 2 in a field F4 when the instruction ACC indicates a writing instruction. A data packet 10P' of FIG. 16, which is a data packet for storing resultant data obtained by accessing extended data storage unit 2 by using data packet 10P, stores, when the access instruction ACC in the corresponding data packet 10P indicates data reading from extended data storage unit 2, the read data RD in a field 73.

With reference to FIGS. 15, 16A and 16B, extended data storage unit 2 will be described.

Extended data storage unit 2 includes a memory 21 for storing data, an instruction decoding portion 22, an access portion 23 including an address storage portion 231, and a packet output portion 24. Extended data storage unit 2 receives data packets 20P and 21P as will be described later from input/output control unit 3 and writes (loads) data stored in the received data packets in memory 21 prior to an execution of the program at information processor 1. Storage unit 2 receives data packet 10P from input/output control unit 3, accesses memory 21 based on information in the received data packet and outputs data packet 10P or 10P' storing access resultant data to input/output control unit 3 during the program is executed. More specifically, input/output control unit 3 applies data packet 10P to instruction decoding portion 22. Decoding portion 22 receives the applied data packet 10P and applies the same packet to output portion 24 while decoding an access instruction ACC in field F2 of the received packet. When the access instruction ACC indicates a writing instruction as a result of the decoding, decoding portion 22 instructs access portion 23 on a writing operation and applies the received packet to access portion 23, and conversely, when the instruction ACC indicates a reading instruction, decoding portion 22 instructs access portion 23 on a reading operation and applies the received packet to access portion 23. Access portion 23 receives the data packet applied from decoding portion 22, addresses memory 21 based on address information AD in the received packet in response to an instruction of a writing operation by decoding portion 22 and writes write data WD of the received packet in an addressing area of memory 21. Conversely, in response to an instruction of a reading operation by decoding portion 22, access portion 23 reads data from memory 21 by addressing based on the address information AD in the received packet. Access portion 23 informs packet output portion 24 of the end of access at the completion of the access to memory 21 and applies data read from memory 21. Packet output portion 24, when it is informed of the end of the access by access portion 23 and supplied with the read data, stores the responsively read data as read data RD in the field F3 of data packet 10P applied from decoding portion 22 and outputs the packet as a data packet 10P' to input/Output control unit 3. When the packet output portion is only informed of the end of the access by access portion 23, it outputs data packet 10P applied from decoding portion 22 to input/output control unit 3. Details of address storage portion 231 will be described later.

With reference to FIG. 13, input/output control unit 3 receives a data packet PA applied from the outside (data packet generation/supply unit 8) information processor 1, and from extended data storage unit 2 and operation unit 6 and selectively outputs the received data packet PA to the outside information processor 1, or to extended data storage unit 2 or to program storage unit 4.

FIG. 17 shows a part of the data flow program to be stored in program storage unit 4. Program storage unit 4 stores a data flow program including a plurality of pairs of designation information, instruction information and copy presence/absence informations shown in FIG. 17. Program storage unit 4 receives a data packet PA applied from input/output control unit 3, reads destination information, instruction information, and copy presence/absence information in a subsequent order from the data flow program by addressing based on destination information in the received packet PA, stores the read destination information and instruction information in a destination field F1 and an instruction field F2 of the received packet PA, respectively, and applies the packet PA to firing control unit 5. When the read copy presence/absence information indicates "absence" at this time, a data packet with the contents in destination field F1 and instruction field F2 updated is output to complete a processing. On the other hand, when the read copy presence/absence information indicates "presence", a data packet with the contents of the destination field and the instruction field updated is output, and subsequently stored destination information, instruction information and copy presence/absence information are read out. When the subsequently read out copy presence/absence information indicates "absence", a data packet is output to complete the processing which stores the same data as that of the received data packet in its data 1 field F3 and the currently read out destination information and instruction information in its destination field F1 and its instruction field F2, respectively. If the subsequently read out copy presence/absence information indicates "presence", the same copy processing is further continued.

Program storage unit 4 receives a data packet PA storing program data read out from extended program storage unit 7 and stores tile program data stored in the received packet PA.

FIG. 18 shows a part of the storage contents of queuing memory 51 in firing control unit 5 of FIG. 13. With reference to FIG. 18, queuing memory 51 stores a plurality of queuing operand data. Fizzing control unit 5 sequentially receives data packets PA applied from program storage unit 4, detects two different data packets PA having the same destination information, stores operand data of one of the data packets PA, for example, the contents of data 1 field, in data 2 field of the other data packet and outputs (hereinafter referred to as "firing") said the other data packet PA. More specifically, firing control unit 5 accesses queuing memory 51 by addressing based on destination information in an applied packet PA and if storage of queuing operand data is detected by the accessing, firing control unit 5 stores the queuing operand data in data 2 field F4 of the applied packet PA and outputs the packet PA. If the queuing operand data is not stored, the firing control unit writes operand data of data 1 field F3 of the applied packet PA in a corresponding addressing area of memory 51. As a result, the applied packet PA is to queue an input of a data packet to be paired. Firing control unit 5 performs the above-described firing detection processing if instruction information in the applied packet PA is a 2-operand instruction, while the unit Outputs the applied data packet PA without being operated if the instruction information is a 1-operand instruction.

Operation unit 6 of FIG. 13 receives a data packet PA applied from firing control unit 5, performs an operation processing for operand data stored in the applied packet PA based on instruction information stored in the applied packet PA, stores the operation resultant data in data 1 field or data 2 field of the applied data packet PA and outputs the applied packet PA to input/output control unit 3.

In data driven type information processor 1 of FIG. 13, data packets storing a data flow program are applied from data packet generation/supply unit 8 to information processor 1 and stored in program storage unit 4 and extended program storage unit 7 prior to an execution of the data flow program. The applied program data are all stored in extended program storage unit 7, while initial program data, for example, a program data group of initial 1K words, of the applied program data, are also stored in program storage unit 4.

FIGS. 19A to 19C are diagrams showing field structures of a data packet supplied from data packet generation/supply unit 8 to information processor 1. When loading of the program data is completed in a manner as described-above, data to be processed in accordance with the program is loaded in extended data storage unit 2 prior to an execution of the loaded program. At the time of the data loading, data packet generation/supply unit 8 applies data packets 20P and 21P respectively shown in FIGS. 19A and 19B to input/output control unit 3. Data packet generation/supply unit 8 first applies data packet 20P to input/output control unit 3, whereby input/output control unit 3 applies data packet 20P to extended data storage unit 2 in response to the branch information of data packet 20P indicating that the information is destined for data storage unit 2. Instruction decoding portion 22 of extended data storage unit 2 receives a data packet 20P and in response to instruction information in the received packet 20P indicating a load instruction LD, instructs access portion 23 on data loading and applies data packet 20P to access portion 23. Access portion 23 receives data packet 20P and temporarily stores in address storing portion 231 a start address and an end address stored in fields F3 and F4 of packet 20P. The start address and the end address are data for specifying an area on memory 21 where data applied hereafter is to be stored. Data packet generation/supply unit 8 outputs data packet 21P of FIG. 19B subsequent to data packet 20P. Input/output control unit 3 receives data packet 21P and in response to branch information in the received packet 21P indicating that the information is destined for data storage unit 2, applies the received packet 21P to extended data storage unit 2. Instruction decoding portion 22 of extended data storage unit 2 receives the data packet 21P and decodes instruction information in packet 21P as a loading instruction LD to instruct access portion 23 on data loading and apply packet 21P to the portion 23. Access portion 23 writes the contents of field F3 of packet 21P in an area of memory 21 specified by a start address and an end address in address storage portion 231. Successive supply of a plurality of data packets 21P to information processor 1 by data packet generation/supply unit 8 stores a plurality of data in an area of memory 21 specified by a start address and an end address in address storage portion 231, resulting in completion of data loading in information processor 1. Data loading in extended data storage unit 2 may be performed prior to the above-described program loading. The information processor is regardless of the order of loading of the program and the data.

Processing in accordance with the program is executed at the completion of loading the program and the data in data driven type information processor 1. First, data packet generation/supply unit 8 applies a data packet 22P shown in FIG. 19C to information processor 1. A destination field F1 of data packet 22P stores branch information indicating that the packet is destined for program storage unit 4, a field F2 stores an execution instruction EX for executing the program and a field F3 stores data. Input/output control unit 3 receives an applied data packet 22P and provides the received packet 22P to program storage unit 4 based on the branch information in packet 22P. Program storage unit 4 reads out destination information and instruction information in a subsequent order by addressing based on the destination information in the received packet 22P. The read out information are respectively stored in fields F1 and F2 of the received packet 22P and the packet is applied to firing control unit 5. Firing control unit 5 performs a processing for detecting firing as described above. A data packet obtained by a firing detection is applied to operation unit 6. Operation unit 6 performs an operation processing with respect to the applied data packet and outputs a data packet which stores the operation resultant data. Input/output control unit 3 receives a data packet applied from operation unit 6 and outputs the data packet to one of the program storage unit 4, outside information processor 1 or extended data storage unit 2 based on the branch information in the received packet. When the data packet is provided to program storage unit 4, destination information and instruction information in a further subsequent order are to be read out. On the other hand, when the data packet is provided to extended data storage unit 2, such access related to memory 21 as described with reference to FIG. 15 is performed and a data packet storing the access resultant data is selectively output to program storage unit 4 or outside information processor 1 through input/output control unit 3.

As a data packet continues to circulate through input/output control unit 3→program storing unit 4→firing control unit 5→operation unit 6→input/output control unit 3→ . . . as described in the foregoing, an operation processing proceeds based on the program and the data stored in program storage unit 4, extended program storage unit 7 and extended data storage unit 2.

Since extended data storage unit 2 has a large capacity but a low access rate in the above-described data driven type information processor, it is preferable to selectively use the storage unit 2 and an internal memory of information processor 1 in order to increase a program's processing rate. For example, data which is frequently accessed is stored in program storage unit 4 or queuing memory 51 both of which have an access rate higher than that of extended data storage unit 2, while data, which is less frequently accessed is stored in extended data storage unit 2. Data stored in extended data storage unit 2 will be referred to as memory data and data flowing as a data packet PA on a transmission path inside the data driven type information processor 1 will be referred to as flow data hereinafter.

Some data processed in accordance with a data flow program are of an array type. An array is a group of data put in an order in one of one-dimensional, two-dimensional, three-dimensional manners and uniquely identified by an English name. The English name is referred to as an array name, one of the data constituting the array is referred to as an array element and an English name for uniquely identifying the element as an array element name. Array type data to be processed in accordance with a data flow program are all processed as memory data. An array to be processed in accordance with the data flow program, for example, a one-dimensional array, will be represented as ar[I] (I=0, 1, 2, 3, . . . n). The array ar[I] indicates that the array name is "ar" and the array element name is "I". The array ar[I] itself is treated as memory data to be stored in memory 21 of extended data storage unit 2, while the array element is treated as flow data. Therefore, by storing a group of data constituting the array ar[I] in memory 21 of storage unit 2 in advance and applying to storage unit 2 a data packet 10P storing the array element name I as address information AD, memory 21 is accessed by addressing based on the array element name I at storage unit 2 to read/write data ar[I]. However, since extended data storage unit 2 is a low-speed access memory, when array type data is used as memory data, a rate of processing the array type data is limited by the access rate of the extended data storage unit 2.

The above-described limitation of the array type data processing rate can be eliminated by treating the array ar[I] itself as flow data similarly to an array element, for which the array ar[I] itself and the array element name should be synchronized with each other. The synchronization is obtained as follows. First, data ar[1], ar[2], . . . ar[n] constituting the array ar[I] are made into data packets PA at data packet generation/supply unit 8 and supplied to data driven type information processor 1. The supplied data packets are applied to firing control unit 5 through input/output control unit 3 and program storage unit 4 to wait for an input of a corresponding array element name I as queuing operand data at queuing memory 51. Thereafter, the program starts to be executed. When a data packet storing an array element name I defined, for example, as 3 in its destination field F1 is applied to firing control unit 5 during the execution, firing is detected to output a data packet storing data ar[3], resulting in synchronization between the array ar[I] itself and the array element name I. It is commonly known that synchronization between data packets PA in a data driven type information processor causes a processing time loss. In other words, a processing time loss is a sum of times for all data ar[1], ar[2] . . . ar[n] constituting the array ar[I] to wait for firing at queuing memory 51 of firing control unit 5.

Another disadvantage is that since all the data ar[1], ar[2], . . . ar[n] constituting the array ar[I] should be made to stand by at queuing memory 51 until an element name I as flow data is defined during the program execution, an extremely large flow graph corresponding to the data flow program is required. Such disadvantage will be described as follows. FIG. 20 is a diagram schematically showing a data flow program development procedure. FIG. 21 is a block diagram showing functions of a compiler related to a conventional data flow program, while FIG. 22 is a block diagram showing functions of a mapper related to the data flow program. FIGS. 23A to 23C are diagrams showing examples of a flow graph obtained by replacing a data flow program for processing array type data. FIGS. 24A to 24D are diagrams showing examples of a data flow program and examples of a flow graph obtained by compiling the program.

As shown in FIG. 20, a data flow program development procedure is made up of a text editor 100, a flow graph compiler 200, a flow graph linker 300 and a mapper 400, functions of which are prepared as software by a work station and the like. First, a data flow program 111 is created through an edition processing by the text editor 100. The data flow program 111 is described based on the C language proposed by the present applicant by using parallel processing language (hereinafter referred to as FGCL: FGCL is an abbreviation of a flow graph C language) with description for data drive added. Flow graph compiler 200, flow graph linker 300 and mapper 400 are processing systems suitable for FGCL. Thorn, the data flow program 111 is subjected to grammatical analysis by flow graph compiler 200 and developed into a plurality of flow graphs having a structure showing data flows on the program in parallel. Flow graph compiler 200 includes a syntax analysis step 201, a flow graph development step 202 and a rank analysis step 203 as shown in FIG. 21. Input data of flow graph compiler 200 is a program 111 described in FGCL. In syntax analysis step 201, the data flow program 111 is applied to see if the description contents of the program 111 match the grammar of FGCL and then in flow graph development step 202, the data flow program 111 is developed into a plurality of flow graphs in parallel in accordance with the contents of the grammar analysis. In rank analysis step 203, the plurality of flow graphs obtained by the development are rearranged to operate in accordance with the order of execution of instructions and the arranged flow graphs are sent to flow graph linker 300. Flow graph linker 300 receives the plurality of flow graphs 211 applied from flow graph compiler 200, groups the flow graphs together into one processable flow graph 311 at information processor 1 and applies the flow graph 311 to mapper 400. Mapper 400 makes the applied flow graph 311 into an object file 411 and an input packet file 412 which are applied to a load packet processing portion 81 and a packet for execution processing portion 82 in data packet generation/supply unit 8 as a target system, respectively. Object file 411 includes a program to be loaded in information processor 1 and initial value data to be loaded in extended data storage unit 2, while input packet file 412 stores information for generating a packet to be applied to information processor 1. Load packet processing portion 81 generates a data packet storing a program and data to be loaded in information processor 1 based on data in object file 411 and packet for execution processing portion 82 generates based on information in input packet file 412, a data packet, for example, to be supplied to information processor 1 while the processor 1 executes the program. Mapper 400 includes step 401 of generating program data to be loaded, a step 402 of generating data to be loaded in storage unit 2 and a step 403 of generating information for use in generating a packet to be supplied to information processor 1 as shown in FIG. 22. In steps 401 to 403, flow graph 311 is input to output object file 411 and input packet file 412. Hereinafter, a flow graph compiler is abbreviated as a compiler.

In compiler 200, the data flow programs shown in FIGS. 24A and 24C, for example, are compiled to be developed into flow graphs of FIGS. 24B and 24D. The two flow graphs are converted by flow graph linker 300 into one flow graph by applying flow graph of FIG. 24D to the part of "funcl" of FIG. 24B.

Compiler 200 complies the array A[I] in the data flow program in a manner as shown in FIGS. 23A to 23C. If an element name I is not defined at a stage of compiling, for example, it is necessary to simultaneously queue data A[1], A[2], . . . A[n] at queuing memory 51. The data A[1], A[2], . . . A[n] are therefore developed in parallel into flow data on the flow graph as shown in FIG. 23A. When the element name I is defined during the execution of the program, the element name I is synchronized (corresponding to sync in FIG. 23A) with data A[I] queuing in memory 51 to detect firing, causing only a data packet storing the data A[I] to flow as flow data. For example, when the element name I is defined as "1" during the execution of the program, only data A[1] selectively flows down the flow graph among the data A[1]-A[n] developed in parallel in the flow graph. In other words, firing is detected by firing control unit 5 of FIG. 13 to output an obtained data packet to operation unit 6.

Conversely, if the element name I is already as defined "3", for example, at a stage of edition of the data flow program 111 by text editor 100, compiler 200 compiles data A[3] in the program 111 as one flow data as shown in FIG. 23C. In other words, the element name I in the data flow program will not be developed into flow data in the flow graph by compiler 200 in this case.

As described in the foregoing, when the element name I is not defined at the time of compiling by compiler 200, all of the supposed data A[1]-A[n] are developed in parallel by the compiler. Therefore, the flow graph obtained by the development (see FIG. 23A) inevitably becomes much larger than the flow graph (see FIG. 23C) obtained by developing the data with the element name already defined at the time of compiling. Thus, if an array is treated as flow data in order to eliminate a limitation in a processing rate as described above, synchronization between an element name and data increases processing time loss and makes the flow graph larger in scale. Therefore, although a processing rate is limited, a program execution controlling method is employed wherein all of array type data are stored in extended data storage unit 2 and treated as memory data.

However, there is a case where an element name I of an array described in the program is already defined at a stage prior to compiling, depending on the contents of a processing expressed by using the data flow program.

In other words, there is a case where an element name I is fixed and not be changed during execution of the data flow program. An array whose element name is not changed during execution of the program is hereinafter referred to as a static array and conversely, an array whose element name is changed during an execution of the program is referred to as a dynamic array. For example, such program description as I=3: b=ar[I]: means that an array ar[I] is a static array and its value is already defined as data ar[3] prior to compiling. In such a case, the element name I is data other than memory data and flow data. The compiler can therefore develop the program description into a flow graph as shown in FIG. 23C at the stage of compiling the data flow program including the description. As described in the foregoing, although some arrays to be processed in accordance with a program can be processed as flow data, a conventional method of controlling execution of a data flow program uniformly processes array type data as memory data, resulting in a decrease of a processing rate of information processor 1 more than required and preventing an effective use of a memory.

SUMMARY OF THE INVENTION

An object of the present invention is to provide a method of controlling execution of a data flow program including a data processing related to an array which method allows an execution processing rate to be increased and an apparatus therefor.

Another object of the present invention is to provide a method of controlling execution of a data flow program including a data processing related to an array which method enables an effective use of a memory in an information processor which executes the program during an execution of the data flow program and an apparatus therefor.

In order to achieve the above-described objects, a method of controlling execution of a data flow program according to the present invention is directed to a method of controlling execution of a data flow program in a data driven type information processor including an information processing unit including a program storage portion, a paired data generation portion and an operation processing portion, and a data storage unit.

The program storage portion stores a data flow program including a plurality of destination information and a plurality of instruction information, receives a data packet comprised of a destination field, an instruction field, and first and second data fields, reads destination information and instruction information in a subsequent order from the data flow program by addressing based on the contents of the destination field of the data packet, stores the respective read information in the destination field and the instruction field of the received data packet and outputs the received data packet.

The paired data generation portion queues data packets output from the program storage portion, stores data of the first data field of one of two data packets having the same destination information in the second data field of the other data packet and outputs said the other data packet.

The operation processing portion receives a data packet output from the paired data generation portion, decodes instruction information in the instruction field of the received data packet, performs an operation processing with respect to data in the first or the second data field of the received data packet, stores the operation result in the first data field of the received data packet and outputs said received data packet.

The data storage unit is connected to the information processing unit for storing in advance data to be processed in accordance with the data flow program and supplying the data to the information processing unit at an execution of the program.

The above-described method of controlling execution of a data flow program includes the steps of indicating whether a value of array type data to be processed in accordance with the data flow program is defined in advance, determining whether the value of the array type data is defined in advance according to the indication in the indicating step, and selectively designating the array type data as data to be stored in the data storage unit in advance or as data to be supplied to the information processor in the form of a data packet. Such a method of controlling execution of a data flow program selectively designates array type data to be processed in accordance with the program as data to be stored in advance in the data storage unit or as data to be supplied to the information processor in the form of a data packet depending on whether the value of the data is defined in advance or not. Therefore, as compared with a conventional case where array type data are uniformly stored in a data storage unit, the present invention requires less number of processings for accessing the data storage unit during the execution of the program, by the number equivalent to the amount of data supplied to the information processor in the form of a data packet. As a result, a program execution processing speed can be improved while effectively using the data storage unit.

In order to achieve the above-described objects, a data flow program execution controlling apparatus according to the present invention is directed to such a data flow program execution controlling apparatus in a data driven type information processor as described above which includes an indication unit for indicating whether a value of array type data to be processed in accordance with a data flow program is defined in advance, a determination unit for determining whether the value of the array type data is defined in advance according to the indication by the indication unit and a designation unit for designating the array type data as data to be stored in the data storage unit in advance or data to be supplied to the information processor in the form of a data packet. According to the data flow program execution controlling apparatus of the present invention, therefore, array type data to be processed in accordance with the data flow program is selectively designated as data to be stored in the data storage unit in advance or data to be supplied to the information processor in the form of a data packet depending on whether the value of the data is defined in advance or not. Therefore, as compared with a conventional case where array type data are uniformly stored in a data storage unit, the present invention requires less number of processings for accessing the data storage unit at the time of an execution of the program, by the number equivalent to the amount of data to be supplied to the information processor in the form of a data packet, thereby increasing a program execution processing rate and making an effective use of the data storage unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are diagrams showing a data flow program in which an array is described as a flow array and a flow graph obtained by compiling the program according to the present embodiment of the present invention, respectively.

FIGS. 2A and 2B show a data flow program in which an array is described as a memory array and a flow graph obtained by compiling the program according to the present embodiment, respectively.

FIG. 4 is a diagram showing a storage state of the data flow program shown in FIG. 1A at a program storage unit.

FIG. 5 is a diagram showing a storage state of the data flow program shown in FIG. 2A at the program storage unit.

FIG. 9 is a diagram showing one example of a data flow program described with memory arrays.

DESCRIPTION OF THE PREFERRED EMBODIMENTS

One embodiment of the present invention will be described in detail in the following with reference to the drawings.

Figure 13:
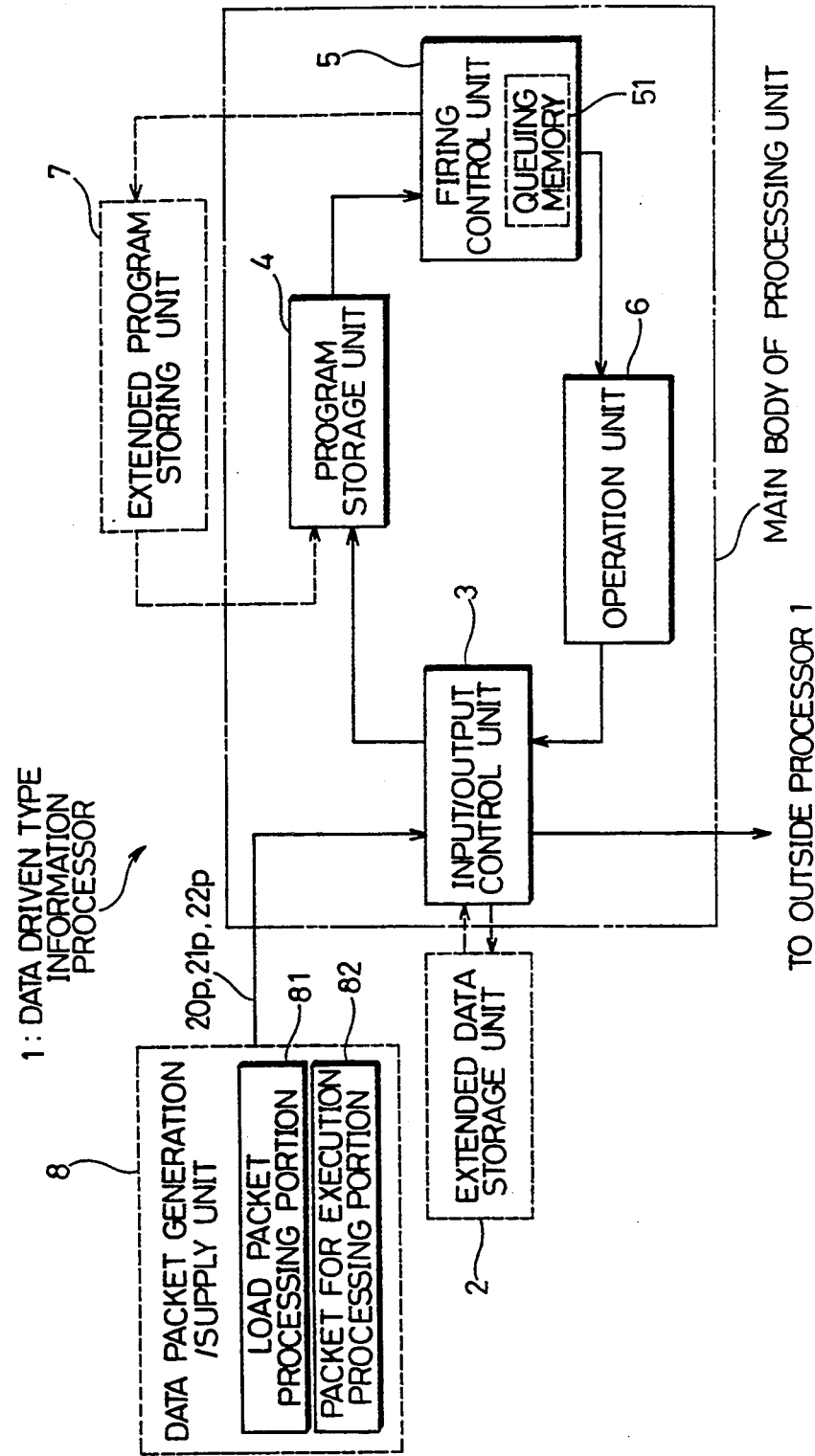
FIG. 13 is a schematic diagram showing the structure of a data driven type information processor to be applied to a conventional example and one embodiment of the present invention.
Figure 14:
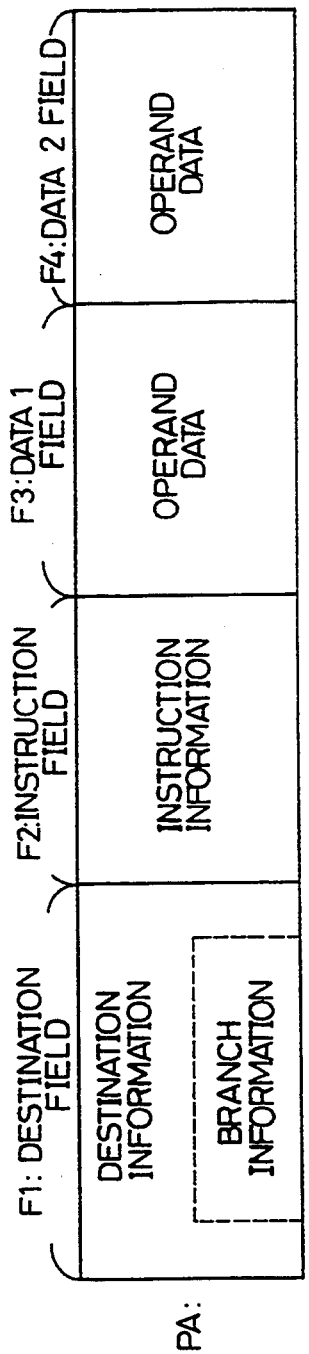
FIG. 14 is a diagram showing a field structure of a data packet circulating through the data driven type information processor to be applied to a conventional example and one embodiment of the present invention.
Figure 15:
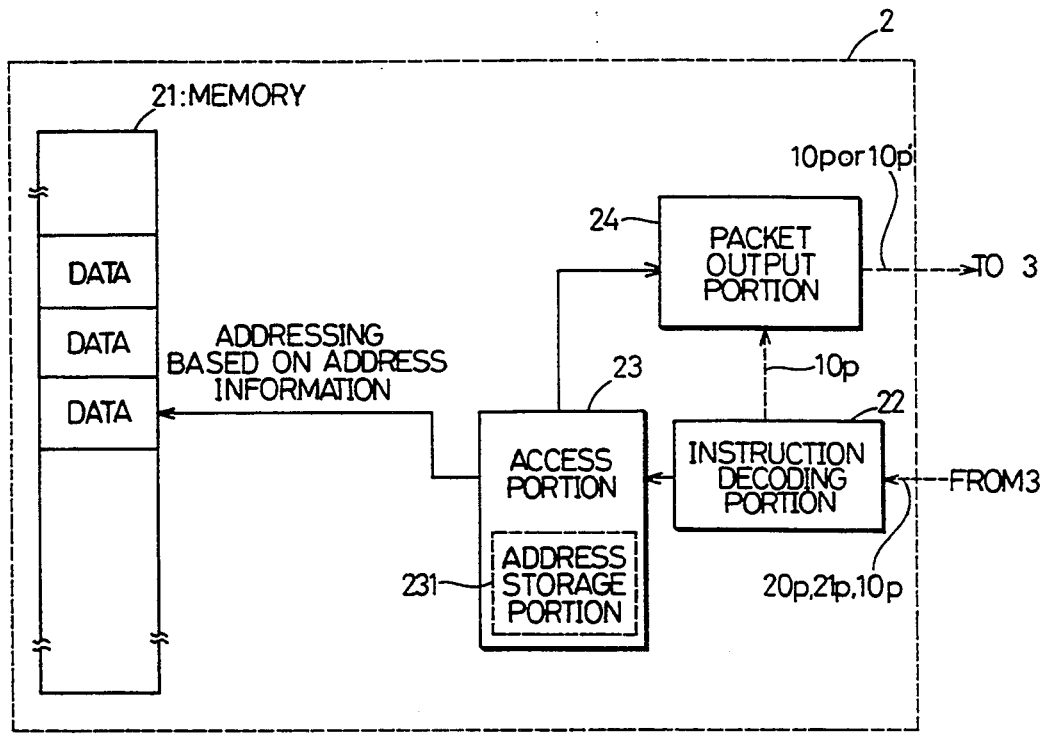
FIG. 15 is a block diagram showing the structure of the extended data storage unit shown in FIG. 13.
Figure 16A:
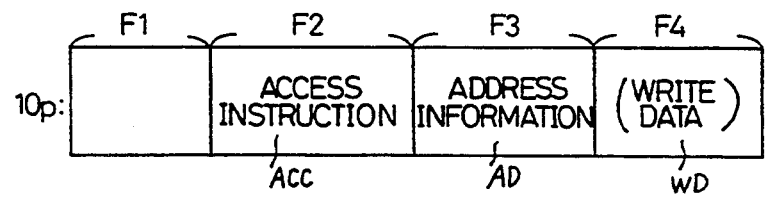
FIGS. 16A and 16B are diagrams showing field structures of data packets for accessing the extended data storage unit shown in FIG. 13.
Figure 16B:
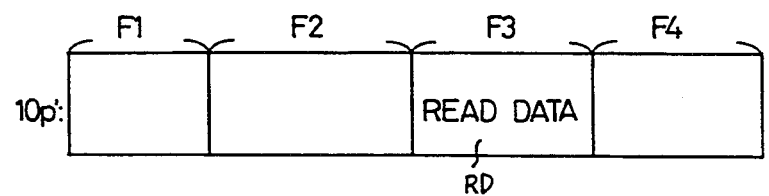
Figure 17:
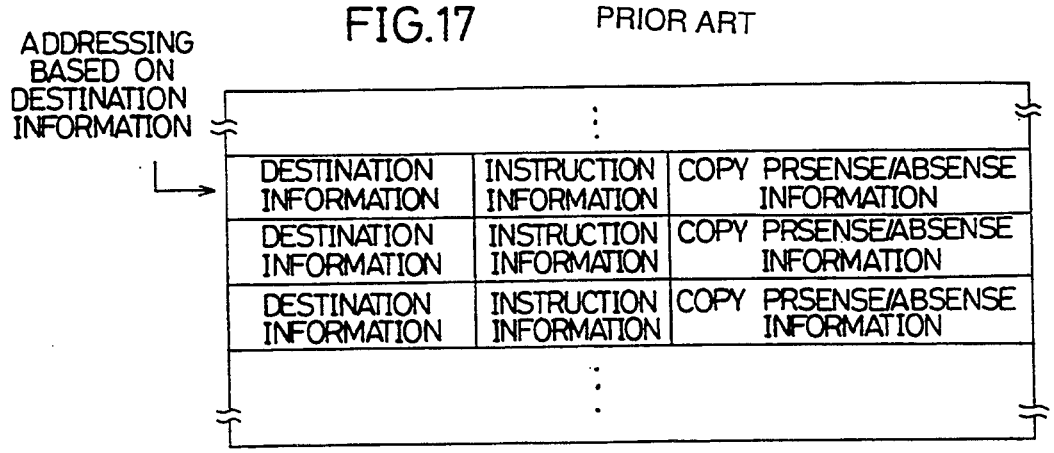
FIG. 17 is a diagram showing a data flow program to be stored in the program storage unit shown in FIG. 13.
Figure 18:
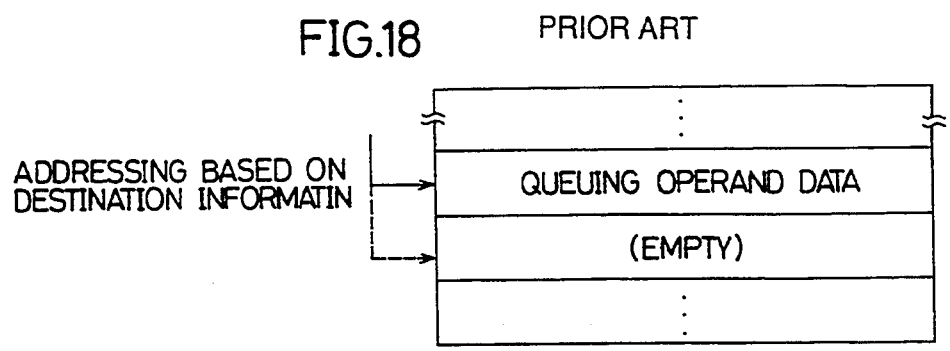
FIG. 18 is a diagram showing a part of storage contents of a queuing memory shown in FIG. 13.
Figure 19A:
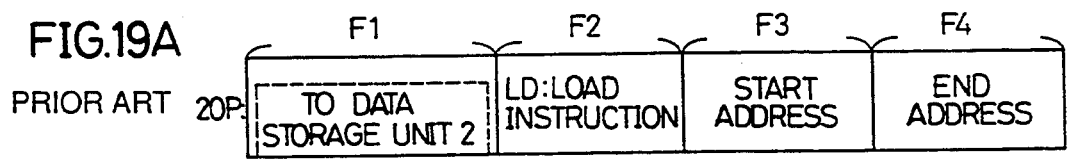
FIGS. 19A to 19C are diagrams showing field structures of data packets to be supplied from a data packet generation/supply unit to a data driven type information processor.
Figure 19B:
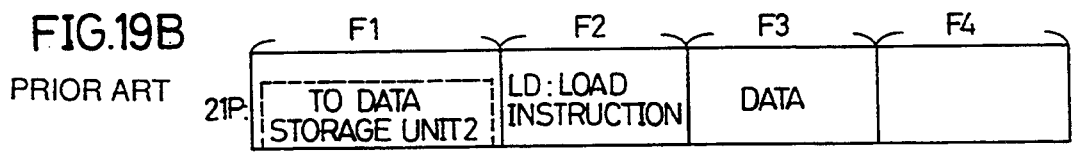
Figure 19C:
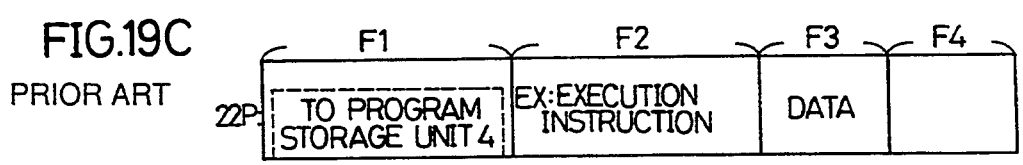

Since the structure of a data driven type information processor and the field structure of a data packet to be applied to the present embodiment are the same as those shown in FIGS. 13 and 14, no detailed description will be given thereto. An array to be processed as flow data will be referred to as a flow array and an array to be processed as memory data will be referred to as a memory array in the following.

A structure is described in a data flow program. The structure has the same function as that of a structure in the C language. A use of the structure enables a plurality of different types of data to be described in a lump. Some of structures described in the data flow program are in general compiled into memory data by a compiler, while others are compiled into flow data by a compiler. Structures of the latter type will be referred to as flow structures hereinafter. The flow structure will have no indication as a structure in compiled data after it is compiled.

A memory array is memory data that cannot be described in a flow structure. The flow array is described as follows:

fstruct tag {array declarator};

in the program by using a flow structure, thereby declaring as flow data. This description manner enables a use of an array even inside the flow structure. For example, with a description that:

fstruct ARY {ar[10]}, the name of the flow structure fstruct is determined as "ARY", an array "ar[10 ]" having the name "ar" is declared and array type data "ar[10]" is compiled by a compiler to be flow data.

An array ar[I] is supposed to be a flow array. Substitution of a value in the array ar[I] or reference to the value of the array ar[I] requires the element name I to be loop data in a "para statement" in a data flow program described in FGCL or to be a fixed value. The "para statement" based on FGCL will be described below.

A para statement in the data flow program is described as follows:

para (Equation 1; Equation 2; Equation 3)
    Statement
} sum;

The main body of the above-described "para statement" is executed in parallel the number of times specified by the same interpretation of a "for statement" which is well-known in other high level languages. The main body of the "para statement" is executed in parallel corresponding to respective values obtained from Equations 1, 2 and 3. Since Equations 1, 2 and 3 are limited to constant expressions, possible values obtained from Equations 1, 2 and 3 are definite fixed values statically determined.

This is because if an array element name I in the flow array ar[I] is neither loop data in the above-described "para statement" nor a fixed value, the element name I changes during execution of a program to make the array ar[I] into a dynamic array which cannot be processed as a flow array. As described in the foregoing, even when an array is declared inside a flow structure, if an element name of the declared array is not a static value which will not change during execution of a program, such is detected as an error by a compiler.

Figure 3:
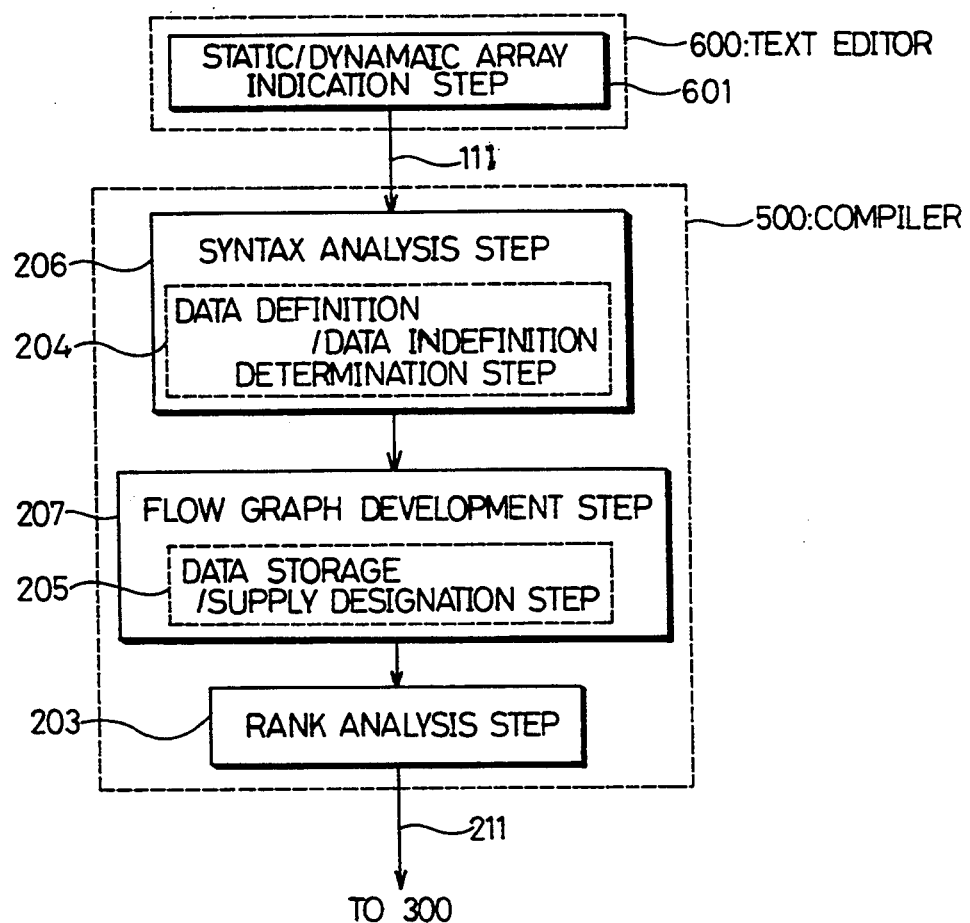
FIG. 3 is a block diagram showing a function of an editor and a compiler according to one embodiment of the present invention.
Figure 6A:
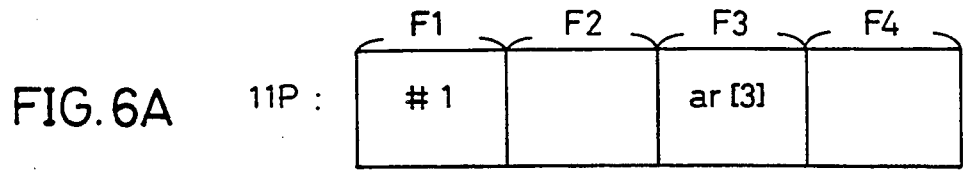
FIGS. 6A and 6B are diagrams showing field structures of a data packet to be provided to and a data packet to be output from a data driven type information processor at the time of an execution of the data flow program shown in FIG. 1A.
Figure 6B:
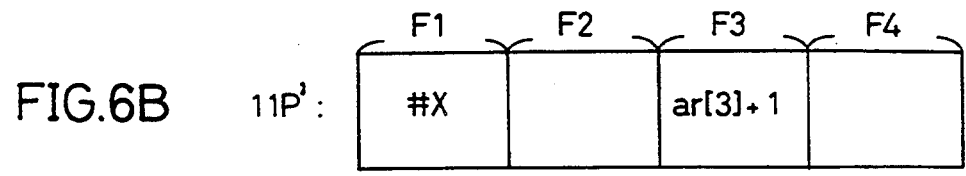
Figure 7A:
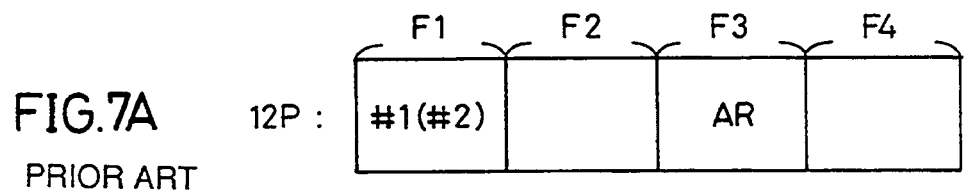
FIGS. 7A and 7B are diagrams showing field structures of a data packet to be provided to and a data packet to be output from the data driven type information processor during the execution of the data flow program shown in FIG. 2A.
Figure 7B:
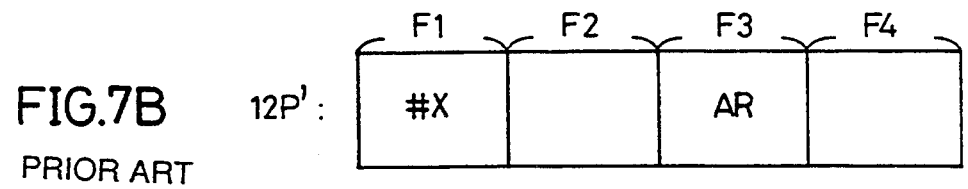
Figures 8A, 8B:
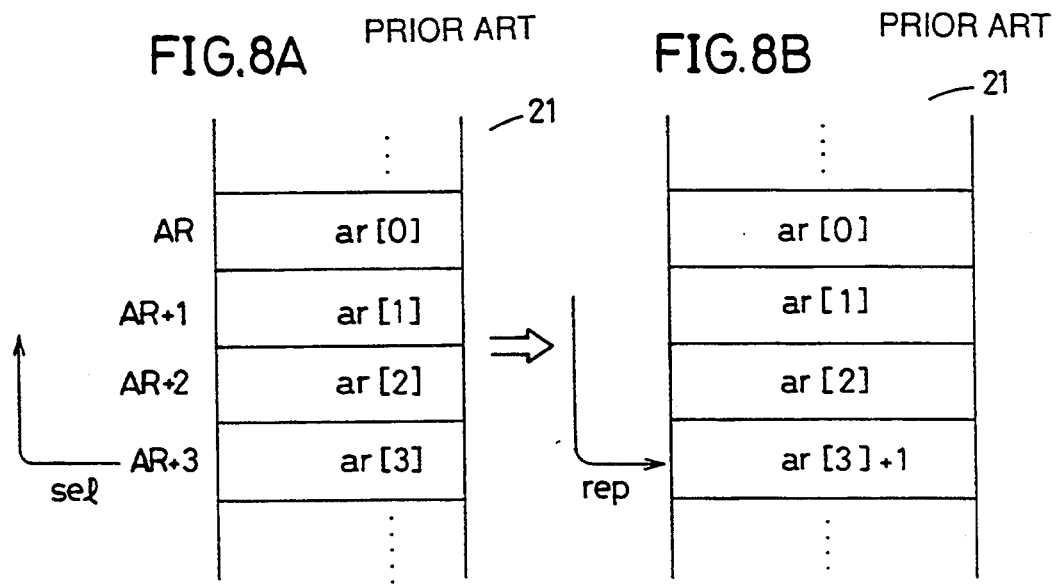
FIGS. 8A and 8B are diagrams showing a part of the storage contents of an extended data storage unit at the time of an execution of the data flow program shown in FIG. 2A.
Figure 10:
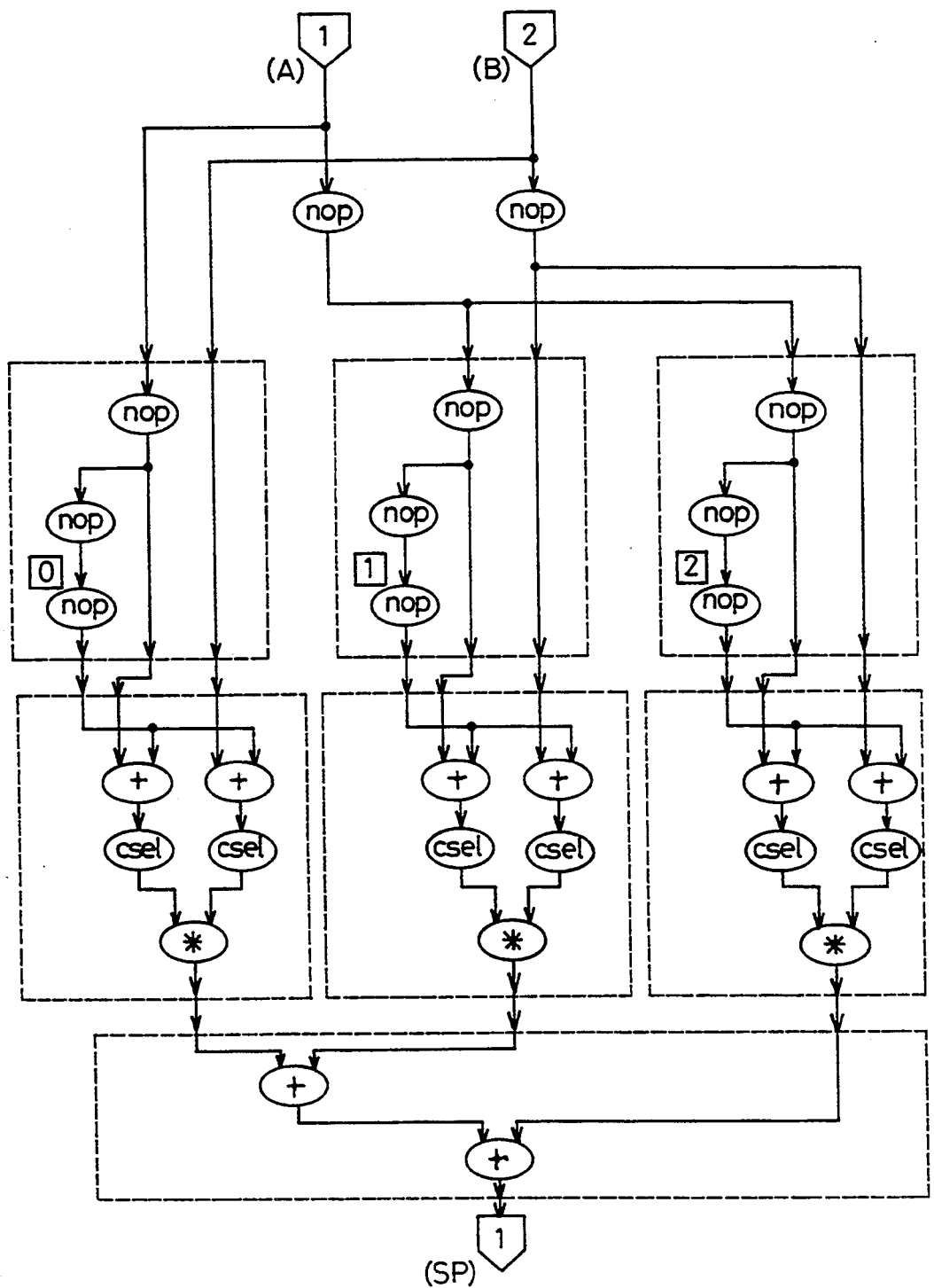
FIG. 10 is a diagram showing a flow graph obtained by compiling the data flow program of FIG. 9.
Figures 11, 12:
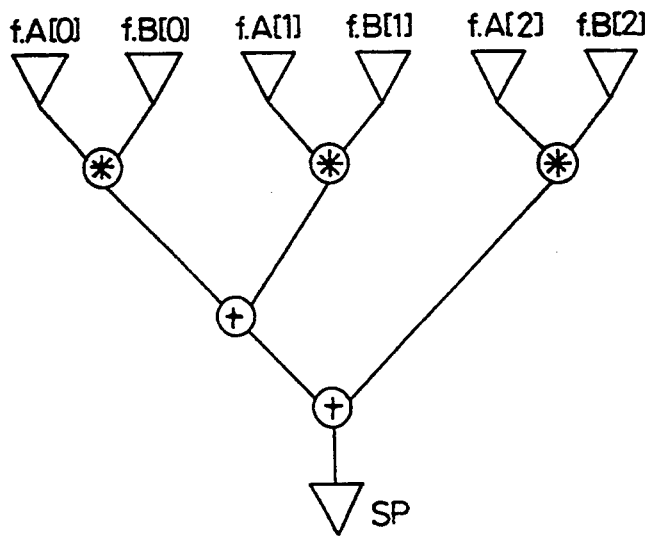
FIG. 11 is a diagram showing one example of a data flow program described with flow arrays.
FIG. 12 is a diagram showing a data flow graph obtained by compiling the data flow program of FIG. 11.

FIGS. 1A and 1B are diagrams respectively showing a data flow program wherein array type data are described as a flow array and a flow graph obtained from the program according to one embodiment of the present invention. FIGS. 2A and 2B are a data flow program obtained by describing a program of the same processing contents as those of the program shown in FIGS. 1A and 1B by using array type data as a memory array and a flow graph obtained from the program, respectively. FIG. 3 is a block diagram showing function of an editor and a compiler according to one embodiment of the present invention. FIG. 4 is a diagram showing a storage state of the data flow program shown in FIG. 1A at the program storage unit 4. FIG. 5 is a diagram showing a storage state of the data flow program shown in FIG. 2A at program storage unit 4. FIGS. 6A and 6B are diagrams showing field structures of a data packet to be provided to and a data packet to be output from an information processor 1 during an execution of the data flow program shown in FIG. 1A. FIGS. 7A and 7B are diagrams showing field structures of a data packet to be provided to and a data packet to be output from information processor 1 during execution of the data flow program shown in FIG. 2A. FIGS. 8A and 8B are diagrams showing a part of the storage contents of a memory 21 during an execution of the data flow program shown in FIG. 2A. FIG. 9 is a diagram showing one example of a data flow program described with memory arrays. FIG. 10 is a diagram showing a flow graph obtained by compiling the data flow program of FIG. 9. FIG. 11 is a diagram showing one example of a data flow program described with flow arrays. FIG. 12 is a diagram showing a data flow graph obtained by compiling the data flow program of FIG. 11.

Figure 20:
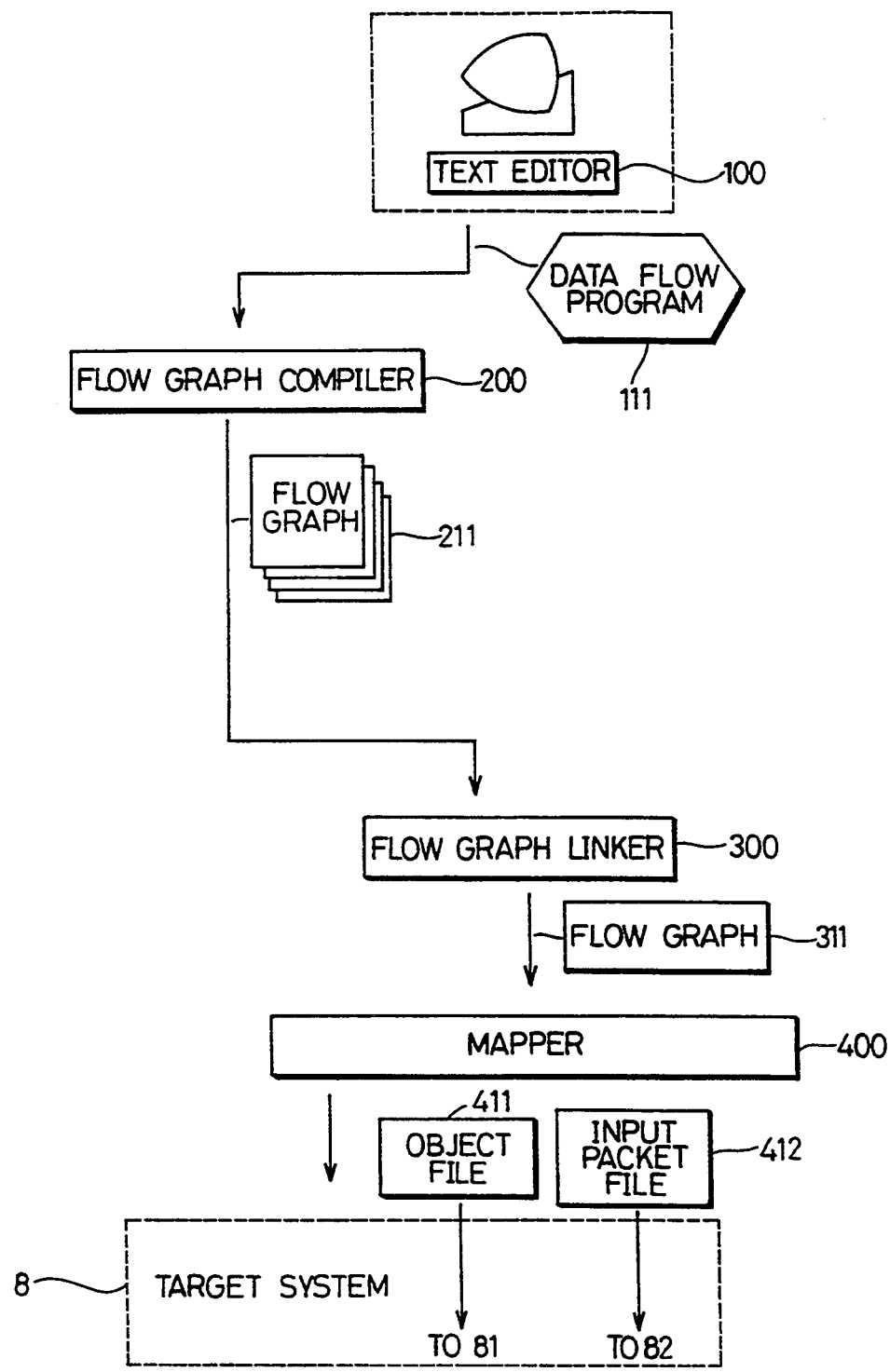
FIG. 20 is a schematic diagram showing a procedure of a data flow program development.
Figure 21:
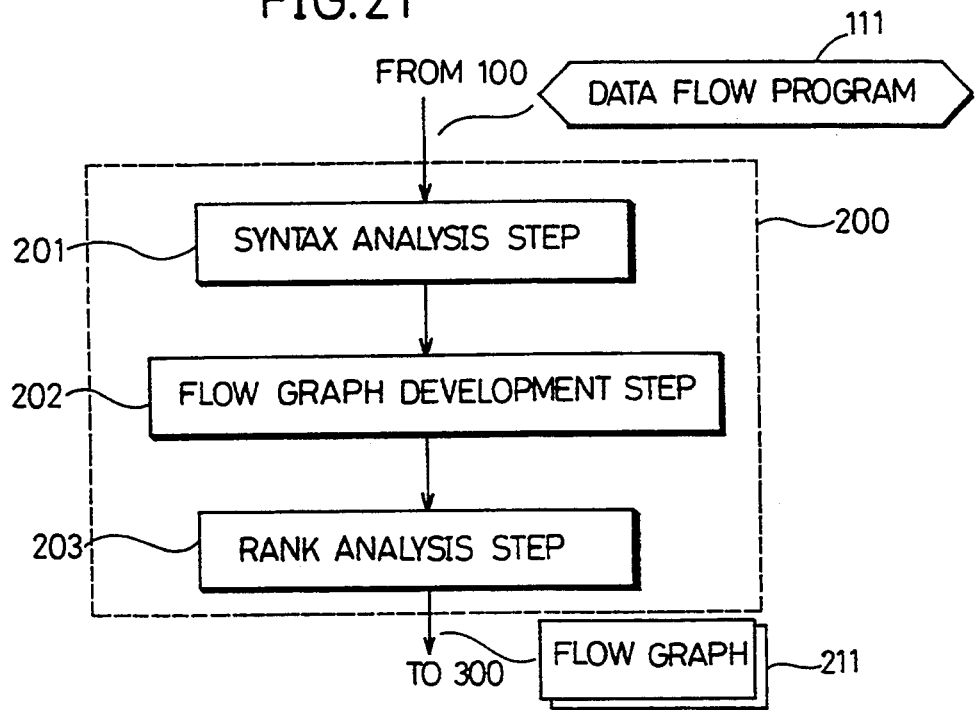
FIG. 21 is a block diagram showing a function of a compiler related to a conventional data flow program.
Figure 22:
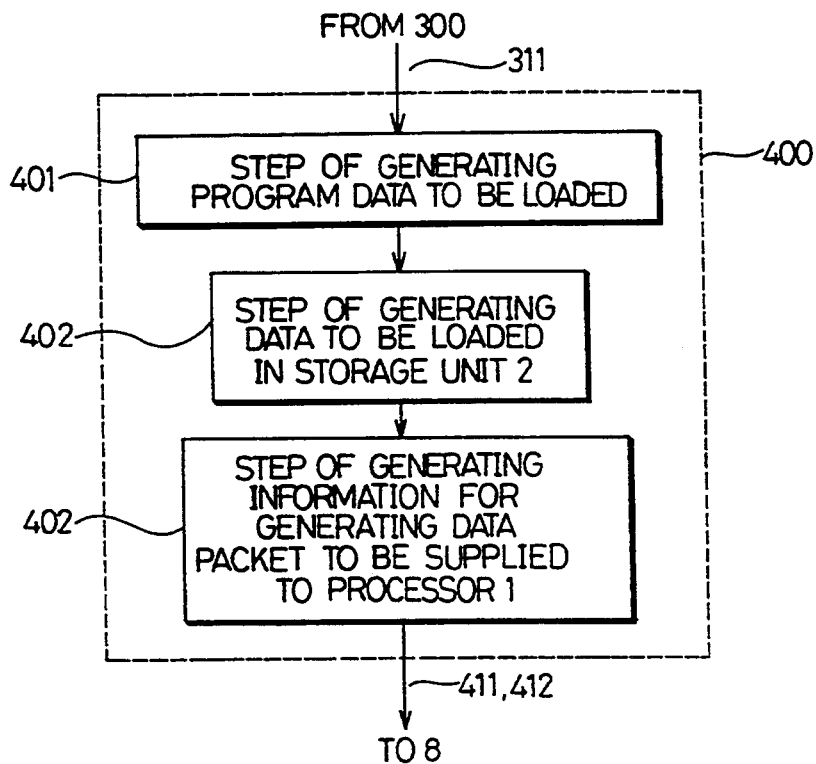
FIG. 22 is a block diagram showing a function of a mapper related to a data flow program.
Figure 23A:
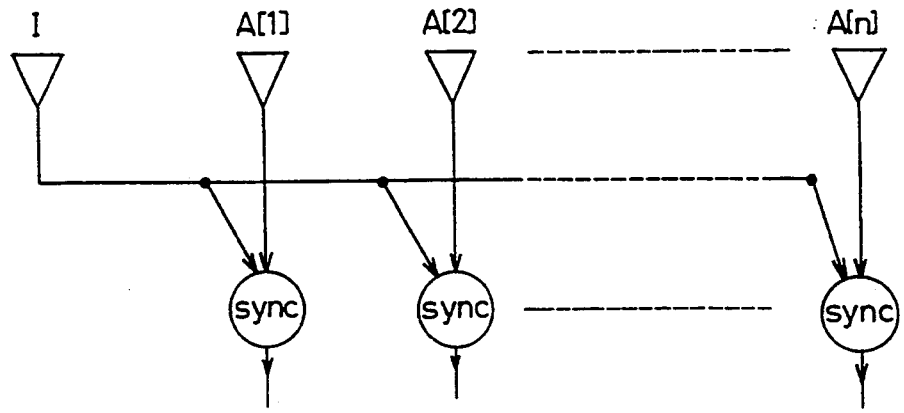
FIGS. 23A to 23C are diagrams showing examples of data flow graphs converted from data flow programs for processing data of an array.
Figure 23B:
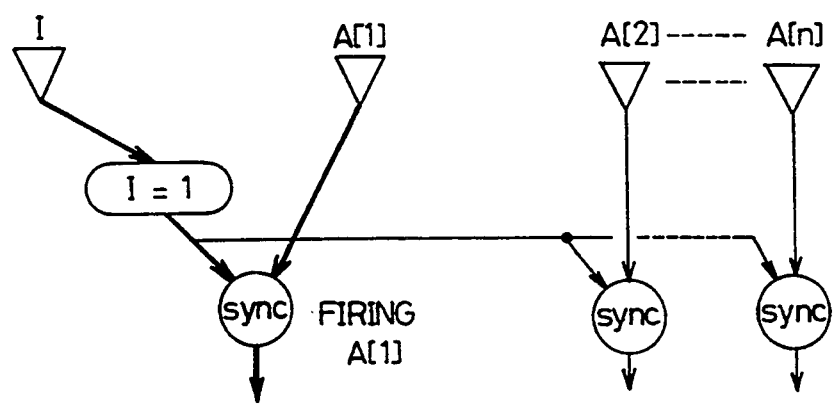
Figure 23C:
Figure 24A:
FIGS. 24A to 24D are diagrams showing examples of a flow graph obtained by compiling a data flow program.
Figure 24C:
Figure 24B:
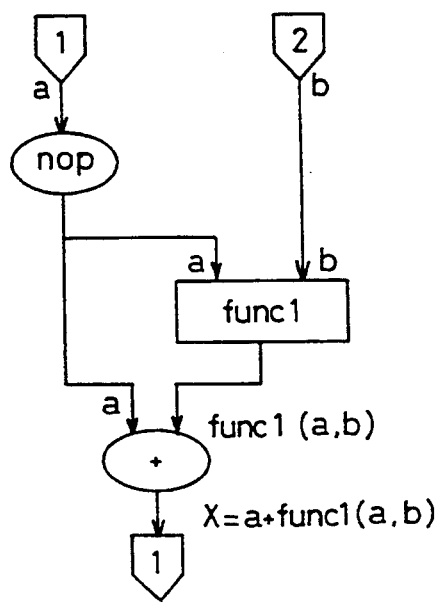
Figure 24D:
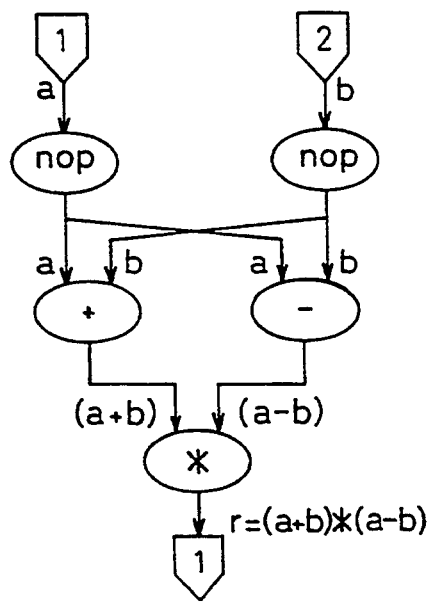

A data flow program development procedure according to one embodiment of the present invention employs, in place of editor 100 and compiler 200 shown in FIG. 20, an editor 600 and a compiler 500 which are improvement of editor 100 and compiler 200, respectively. The other functions for implementing the development procedure are the same as those shown in FIG. 20 and no detailed description thereof will be made. Editor 600 includes a step 601 of indicating a static/dynamic array for statically/dynamically declaring an array by using a flow structure etc. Compiler 500, as shown in FIG. 3, includes a syntax analysis step 206 including a data definite/indefinite determining step 204, a flow graph development step 207 including a data storage/supply designating step 205 and a conventional rank analysis step 203. At data definite/indefinite determination step 204, a determination is made whether array type data described in the data flow program 111 by using the text editor 600 is declared by using, for example, the above-described flow structure, that is, a determination is made whether the data is definite or indefinite based on the indication by step 601. The array type data determined as being definite (declared in the flow structure) is analyzed as flow data, while an array which is not declared by using the flow structure is analyzed as a memory array. The other functions of syntax analysis step 206 are the same as conventional functions. At data storage/supply designating step 205, a processing is carried out, in response to a determination result obtained at step 204, not to represent in the flow graph an element name of the array type data analyzed as a flow array in the data flow program 111 and represent in the flow graph an element name of the array type data determined as a memory array. The other functions of flow graph development step 207 are the same as conventional functions. At rank analysis step 203, a plurality of flow graphs in accordance with the data flow program 111 obtained through steps 206 and 207 are re-arranged in the order of executions to be made into a flow graph 211 which is applied to a conventional flow graph linker 300.

FIG. 9 shows one example of a program using a memory array. The program of FIG. 9 shows a processing of declaring arrays A[3] and B[3] whose element names are already defined as memory arrays and repeatedly performing an operation by substituting each of 0, 1 and 2 as i in the main body of the "para statement", that is, the equation SP=A[i]*B[i]. Compiling the data flow program 111 shown in FIG. 9 by compiler 500 obtains the flow graph of FIG. 10 and develops the array type data A[0], A[1] and A[2] and B[0], B[1] and B[2] into memory arrays to be stored in extended data storage unit 2 prior to the execution of the program. Ovals in the data flow graph of FIG. 10 represent nodes in which codes of instructions to be executed are shown. An instruction code "csel" of FIG. 10 denotes an instruction of data reading from extended data storage unit 2. It can be seen from the flow graph of FIG. 10 that when the data flow program of FIG. 9 is executed at information processor 1, extended data storage unit 2 is accessed at least six times.

FIG. 11 shows a data flow program wherein the same processing contents as those of the data flow program of FIG. 9 are declared as arrays A[3] and B[3] by using a flow structure "flow" and described as flow arrays. It should be noted that element names of the arrays A[3] and B[3] are used as loop data of a "pare statement" in the data flow program of FIG. 11. Compiling the program shown in FIG. 11 by compiler 500 results in that the flow arrays A[3] and B[3] are compiled into flow data by steps 204 and 205 of compiler 500. The data flow graph obtained by compiling the data flow program is shown in FIG. 12. In the data flow graph of FIG. 12, flow data f.A[0], f. B[0], f. A[1], f. B[1], f. A[2], f. B[2] are set at nodes for input, respectively.

As described in the foregoing and as can be also seen from FIGS. 10 and 12, a data flow program representing the same processing contents has its flow graph much smaller in size when a static array to be processed in accordance with the program is processed as a flow array than in a case where the static array is processed as a memory array. In addition, since the flow graph of FIG. 12 includes no node allotted the above-described instruction code "csel", when the program of FIG. 11 is executed at information processor 1, the number of accesses of extended data storage unit 2 is zero, so that the program execution processing speed can be more increased than that of a case where the program shown in FIG. 9 is executed because no access processing of the data storage unit 2 is required.

The following is a description that even a data flow program using the same static array and having the same processing contents may have a different program processing speed and a different amount of program data to be stored in program storage unit 4 depending on whether the program is described with memory arrays or flow arrays.

FIGS. 1A and 1B respectively show a data flow program wherein a processing of incrementing array type data ar[3] is described and a flow graph obtained by compiling the program using compiler 500. The program of FIG. 1A, wherein the data ar[3] is declared by using the flow structure "flow", is compiled by compiler 500 to obtain the flow graph shown in FIG. 1B. The flow graph shows a node allotted a node number #1 and a node allotted a node number #X. Each node number represents destination information and an instruction code indicated in each node represents instruction information. During an execution of the program of FIG. 1A, data packet generation/supply unit 8 supplies a data packet 11P shown in FIG. 6A to information processor 1. Data packet 11P stores node number #1 as destination information in a field F1 and data ar[3] as operand data in a field F3. When data packet generation/supply unit 8 applies data packet 11P to information processor 1, input/output control unit 3 first receives data packet 11P and applies the same to program storage unit 4. Program storage unit 4 receives the applied packet 11P, reads destination information (node No. #X) and instruction information (inc) in the subsequent order shown in FIG. 4 by addressing based on node number #1 in field F1 of the received packet 11P, stores the respective read information in fields F1 and F2 of the received packet 11P and outputs said packet 11P to firing control unit 5. In response to the instruction information (the instruction code inc) in the received data packet 11P indicating a 1-operand instruction, firing control unit 5 outputs packet 11P without operating the same and applies the packet to operation unit 6. Operation unit 6 receives data packet 11P, decodes the instruction code inc and performs an operation processing with respect to the data ar[3] in field F3 of the received packet 11P in accordance with the decoding result, so that field F3 and a data packet 11P' shown in FIG. 6B is output from operation unit 6.

As described in the foregoing, the program shown in FIG. 1A requires only one program step to be stored in program storage unit 4, no access to extended data storage unit 2 and an operation to be performed only once at operation processing unit 6.

FIGS. 2A and 2B show a program wherein the above-described incrementing processing shown in FIG. 1A is described with declaring the array type data ar[3] as a memory array and a data flow graph obtained by compiling the program by compiler 500, respectively. According to the flow graph shown in FIG. 2B, it is necessary to store 10 steps of such program data as shown in FIG. 5 in program storage unit 4 in order to execute the program of FIG. 2A. In addition, as can be seen from the data flow graph, operation processings of operation unit 6 are carried out at respective nodes allotted node numbers #1, #2, #4, #6 and #8. Furthermore, an instruction code "sel" for commanding the extended data reading from data storage unit 2 and an instruction code "rep" for writing data are executed at the nodes allotted node numbers #5 and #7 according to the flow graph. In other words, when in executing the program of FIG. 2A, the operation processing is carried out three times at operation unit 6 and extended data storage unit 2 requires two access processing operations. When executing the program of FIG. 2A, two data packets 12P as shown in FIG. 7A are first applied from data packet generation/supply unit 8. Data packet 12P stores node number #1 or #2 as destination information in field F1 and data AR in field F3. The data AR is equivalent to address information AD for accessing memory 21 of extended data storage unit 2. After loading the program in program storage unit 4 shown in FIG. 5 all of array type data related to the array ar[I] as shown in FIG. 8A are loaded in memory 21. After the completion of data loading in memory 21, data packet generation/supply unit 8 supplies two data packets 12P shown in FIG. 7A to information processor 1. Information processor 1 processes the supplied data packets 12P in accordance with the flow graph shown in FIG. 2. In the flow graph, when an instruction node with node No. #5 is executed, data ar[3] is read from memory 21 as shown in FIG. 8A and applied to operation unit 6 through program storage unit 4 and firing control unit 5. Since operation unit 6 increments the data ar[3] (an execution of the node allotted node No. #6), the data ar[3] is updated to be data (ar[3]+1) and applied to extended data storage unit 2 through input/output control unit 3. Extended data storage unit 2, wherein the node allotted node No. #7 is executed, the contents of a region specified by an address (AR+3) in memory 21 are updated to become data (ar[3]+1) as shown in FIG. 8B.

It can been seen from the foregoing that as compared with a method of controlling an execution of a data flow program using the memory array as shown in FIG. 2A, a program execution controlling method in accordance with a data flow program with the flow array as shown in FIG. 1A requires one-third the number of operations at operation unit 6, based on a simple calculation, and requires no access to extended data storage unit 2 to improve a program execution processing speed even if the processing contents using a static array are the same.

As is also seen from FIGS. 4 and 5, the program execution controlling system using a flow array is a more effective use of a memory in the program storage unit 4 and extended data storage unit 2.

As described above, since the present embodiment is directed to a method of controlling execution of a program wherein array type data to be processed in accordance with a data flow program are grouped into a static array and a dynamic array, with the static array being applied as flow data to information processor 1 and the dynamic array being stored as data in advance in extended data storage unit 2, such improvement in a program execution processing speed and an effective use of a memory as described above can be preferably realized even if a static array and a dynamic array exist in arrays to be processed in accordance with the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling execution of a data flow program in a data driven type information processor including, information processing means having,
program storing means for storing a data flow program having a plurality of destination information and a plurality of instruction information, receiving a data packet with a destination field for storing destination information, an instruction field for storing instruction information and first and second data fields for storing data, reading destination information and instruction information from said data flow program by addressing based on destination information in the destination field of the received data packet, storing the respective read information in the destination field and the instruction field of the received data packet and outputting said received data packet;
paired data generating means for queuing data packets output from said program storing means, storing data in a first data field of one of two data packets having the same destination information in a second data field of the other data packet and outputting said the other data packet; and
operating means for receiving the data packet output from said paired data generating means, decoding instruction information in the instruction field of the received data packet, operating data in the first or the second data field of the received data packet, storing the operation result in the first data field of the received data packet and outputting said received data packet; and
data storing means connected to said information processing means for storing data to be processed in accordance with said data flow program in advance and supplying the data to said information processing means during execution of the program, said method including the steps of:
indicating whether a value of array type data stored in said data packet to be processed in accordance with said data flow program is defined in advance;
determining whether the value of said array type data is defined in advance according to the indication by said indicating step; and
selectively designating whether said array type data is to be stored in advance in said data storing means or to be supplied to said information processor in the form of said data packet based on the determination result of said determining step.

2. The method of controlling execution of a data flow program according to claim 1, wherein said designating step includes the steps of:
designating the array type data as data to be stored in said data storing means in advance when it is determined in said determination step that the value of said array type data is defined in advance, and
designating the array type data as data to be supplied to said information processor in the form of said data packet during execution of said data flow program when it is determined in said determination step that the value of said array type data is not defined.

3. The method of controlling execution of a data flow program according to claim 2, further including the steps of:

firstly converting said array type data designated as data to be stored in said data storing means by said designating step into data loadable in said data storing means; and
secondly converting said array type data designated as data to be supplied to said information processor in the form of said data packet by said designating step into information for generating said data packet.

4. The method of controlling execution of a data flow program according to claim 3, wherein
said data packet further stores branch information for designating, as its supply destination for export to an outside processor, one of said program storing means, said information processor, and said data storing means,
said data storing means further includes;
a memory for storing data to be processed in accordance with said data flow program,
means for receiving an applied data packet and accessing said memory based on instruction information in the instruction field of the received packet and the contents of the first or the second data field of the received packet, and
means for storing the result of the access by said accessing means in the first or the second data field of the received data packet and outputting the received data packet, and
said information processor further includes;
supply controlling means for receiving a data packet supplied from outside said information processor, or a data packet output from said operating means, or a data packet output from said data storing means, determining said supply destination of the received data packet based on said branch information in the received data packet and outputting the received packet to the determined supply destination, and
packet supplying means for externally supplying said data packet to said information processor.

5. The method of controlling execution of a data flow program according to claim 2, wherein
said data packet further stores branch information for designating, as its supply destination, one of said program storing means, said information processor for export to an outside processor, and said data storing means,
wherein said data storing means further includes,
a memory for storing data to be processed in accordance with said data flow program,
means for receiving an applied data packet and accessing said memory based on instruction information in the instruction field of the received packet and the contents of the first or the second data field of the received packet, and
means for storing the result of the access by said accessing means in the first or the second data field of the received data packet and outputting the received data packet, and
said information processor further includes:
supply controlling means for receiving a data packet supplied from outside said information processor,or a data packet output from said operating means, or a data packet output from said data storing means, determining said supply destination of the received data packet based on said branch information in the received data packet and outputting the received data packet to the determined supply destination, and packet supplying means for externally supplying said data packet to said information processor.

6. The method of controlling execution of a data flow program according to claim 1, further including the steps of:

firstly converting said array type data designated as data to be stored in said data storing means by said designating step into data loadable in said data storing means; and secondly converting said array type data designated as data to be supplied to said information processor in the form of said data packet by said designating step into information for generating said data packet.

7. The method of controlling execution of a data flow program according to claim 6, wherein said data packet further stores branch information for designating, as its supply destination, one of said program storing means, said information processor for export to an outside processor, and said data storing means, said data storing means further includes, a memory for storing data to be processed in accordance with said data flow program, means for receiving an applied data packet and accessing said memory based on instruction information in the instruction field of the received packet and the contents of the first or the second data field of the received packet, and means for storing the result of the access by said accessing means in the first or the second data field of the received data packet and outputting the received data packet, and said information processor further includes, supply controlling means for receiving a data packet supplied from outside said information processor, or a data packet output from said operating means, or a data packet output from said data storing means, determining said supply destination of the received data packet based on said branch information in the received data packet and outputting the received packet to the determined supply destination, and packet supplying means for externally supplying said data packet to said information processor.

8. The method of controlling execution of a data flow program according to claim 1, wherein said data packet further stores branch information for designating, as its supply destination, one of said program storing means, said information processor, and said data storing means, wherein said data storing means further includes, a memory for storing data to be processed in accordance with said data flow program, means for receiving an applied data packet and accessing said memory based on instruction information in the instruction field of the received packet and the contents of the first or the second data field of the received packet, and means for storing the result of the access by said accessing means in the first or the second data field of the received data packet and outputting the received data packet, and said information processor further includes, supply controlling means for receiving a data packet supplied from outside said information processor, or a data packet output from said operating means, or a data packet output from said data storing means, determining said supply destination of the received data packet based on said branch information in the received data packet and outputting the data packet to the determined supply destination, and packet supplying means for externally supplying said data packet to said information processor.

9. An apparatus for controlling execution of a data flow program in a data driven type information processor, comprising information processing means including, program storing means for storing a data flow program comprised of a plurality of destination information and a plurality of instruction information, receiving a data packet comprised of a destination field for storing destination information, an instruction field for storing instruction information and first and second data fields for storing data, reading destination information and instruction information from said data flow program by addressing based on destination information in the destination field of the received data packet, storing the respective read information in the destination field and the instruction field of the received data packet and outputting said received data packet;

paired data generating means for queuing said data packets output from said program storing means, storing data in a first field of one of two data packets having the same destination information in a second data field of the other data packet and outputting said the other data packet, and operating means for receiving said data packet output from said paired data generating means, decoding instruction information in the instruction field of the received data packet, operating the data in the first or the second data field of the received data packet, storing the operation result in the first data field of the received data packet and outputting said data packet;

data storing means connected to said information processing means for storing data to be processed in accordance with said data flow program in advance and supplying the data to said information processing means at the time of an execution of the program;

indicating means for indicating whether a value of array type data stored in said data packet to be processed in accordance with said data flow program is defined in advance;

determining means for determining whether the value of said array type data is defined in advance according to the indication by said indicating means; and selectively designating means for selectively designating whether said array type data is to be stored in said data storing means in advance or to be supplied to said information processor in the form of said data packet based on the determination result of said determining means.

10. The data flow program execution controlling apparatus according to claim 9, wherein said designating means designates said array type data as data to be stored in said data storing means in advance when said determining means determines that the value of said array type data is defined in advance, and designates said array type data as data to be supplied to said information processor in the form of said data packet during execution of said data flow program when said determining means determines that the value of said array type data is not defined.

11. The data flow program execution controlling apparatus according to claim 10, further comprising:

first converting means for converting said array type data designated as data to be stored in said data storing means by said designating means into data loadable in said data storing means, and second converting means for converting said array type data designated as data to be supplied to said information processor in the form of said data packet by said designating means into information for generating said packet.

12. The data flow program execution controlling apparatus according to claim 11, wherein said data packet further stores branch information for designating, as its supply destination, one of said program storing means, said information processor for export to an outside processor, and said data storing means;

said data storing means further includes, a memory for storing data to be processed in accordance with said data flow program, means for receiving an applied data packet and accessing said memory based on instruction information in the instruction field of the received packet and the contents of the first or the second data field of the received packet, and means for storing the result of the access by said accessing means in the first or the second data field of the received data packet and outputting said received data packet; and said information processor further includes, supply controlling means for receiving a data packet supplied from outside said information processor, or a data packet output from said operating means, or a data packet output from said data storing means, determining said supply destination of the received data packet based on said branch information in the received data packet and outputting the received data packet to the determined supply destination, and packet supplying means for externally supplying said data packet to said information processor.

13. The data flow program execution controlling apparatus according to claim 12, wherein said data packet supplying means further includes, load packet supplying means for generating a data packet storing array type data corresponding to the loadable data in its first or the second data field based on data loadable in said data storing means corresponding to said array type data converted by said first converting means, storing, in the data packet, load designating information for designating the data in the first or the second data field of the data packet as data to be loaded in said memory, and supplying the data packet to said information processor, and execution packet supplying means for generating a data packet storing array type data corresponding to the information in the first or the second field based on information for generating said data packet corresponding to the array type data converted by said second converting means, storing, in the data packet, execution designating information designating the data in the first or the second data field of the generated data packet as data to be processed in accordance with the data flow program, and supplying the generated data packet to said information processor during an execution of said data flow program.

14. The data flow program execution controlling apparatus according to claim 13, wherein said load designating information includes branch information and instruction information in a data packet corresponding to the designating information, said branch information indicating that the data packet is to be supplied to said data storing means and said instruction information indicating an instruction of loading data in said memory, and said execution designating information includes branch information in a data packet corresponding to the designating information, said branch information indicating that the data packet is to be supplied to said program storing means.

15. The data flow program execution controlling apparatus according to claim 10, wherein said data packet further stores branch information for designating, as its supply destination, one of said program storing means, said information processor for export to an outside processor, and said data storing means, said data storing means further includes, a memory for storing data to be processed in accordance with said data flow program, means for receiving an applied data packet and accessing said memory based on instruction information in the instruction field of the received packet and the contents of the first or the second data field of the received packet, and means for storing the result of the access by said accessing means in the first or the second data field of the received data packet and outputting the received data packet; and said information processor further includes, supply controlling means for receiving a data packet supplied from outside said information processor, or a data packet output from said operating means, or a data packet output from said data storing means, determining said supply destination of the received data packet based on said branch information in the received data packet and outputting the received data packet to the determined supply destination, and packet supplying means for externally supplying said data packet to said information processor.

16. The data flow program execution controlling apparatus according to claim 9, further comprising:

first converting means for converting said array type data designated as data to be stored in said data storing means by said designating means into data loadable in said data storing means; and second converting means for converting said array type data designated as data to be supplied to said information processor in the form of said data packet by said designating means into information for generating said data packet.

17. The data flow program execution controlling apparatus according to claim 16, wherein said data packet further stores branch information for designating, as its supply destination, one of said program storing means, said information processor for export to an outside processor, and said data storing means;

said data storing means further includes, a memory for storing data to be processed in accordance with said data flow program, means for receiving an applied data packet and accessing said memory based on instruction information in the instruction field of the received packet and the contents of the first or the second data field of the received packet, and means for storing the result of the access by said accessing means in the first or the second data field of the received data packet and outputting said received data packet; and said information processor further includes, supply controlling means for receiving a data packet supplied from outside said information processor, or a data packet output from said operating means, or a data packet output from said data storing means, determining said supply destination of the received data packet based on said branch information in the received data packet and outputting the received data packet to the determined supply destination, and packet supplying means for externally supplying said data packet to said information processor.

18. The data flow program execution controlling apparatus according to claim 17, wherein said data packet supplying means further includes, load packet supplying means for generating a data packet storing array type data corresponding to the loadable data in its first or second data field based on data loadable in said data storing means corresponding to said array type data converted by said first converting means, storing, in the data packet, load designating information for designating the data in the first or the second data field of the data packet as data to be loaded in said memory, and supplying the data packet to said information processor, and execution packet supplying means, for generating a data packet storing array type data corresponding to the information in the first or the second field based on information for generating said data packet corresponding to the array type data converted by said second converting means, storing, in the generated data packet, execution designating information designating the data in the first or the second data field of the generated data packet as data to be processed in accordance with the data flow program, and supplying the generated data packet to said information processor during an execution of said data flow program.

19. The data flow program execution controlling apparatus according to claim 18, wherein said load designating information includes branch information and instruction information in a data packet corresponding to the designating information, said branch information indicating that the data packet is to be supplied to said data storing means and said instruction information indicating an instruction of loading data in said memory, and said execution designating information includes branch information in a data packet corresponding to the designating information, said branch information indicating that the data packet is to be supplied to said program storing means.

20. The data flow program execution controlling apparatus according to claim 9, wherein said data packet further stores branch information for designating, as its supply destination, one of said program storing means, said information processor for export to an outside processor, and said data storing means, said data storing means further includes, a memory for storing data to be processed in accordance with said data flow program, means for receiving an applied data packet and accessing said memory based on instruction information in the instruction field of the received packet and the contents of the first or the second data field of the received packet, and means for storing the result of the access by said accessing means in the first or the second data field of the received data packet and outputting the received data packet; and said information processor further includes, supply controlling means for receiving a data packet supplied from outside said information processor, a data packet output from said operating means, or a data packet output from said data storing means, determining said supply destination of the received data packet based on said branch information in the received data packet and outputting said data packet to the determined supply destination, and packet supplying means for externally supplying said data packet to said information processor.

* * * * *